United States Patent [19]

Schmitt et al.

[11] 4,167,618

[45] Sep. 11, 1979

[54] POLYMERIZATION PROCESS FOR AZIRIDINE COMPOUNDS

[75] Inventors: Werner Schmitt; Robert Purrman, both of Starnberg; Peter Jochum; Wolf-Dieter Zahler, both of Hechendorf, all of Fed. Rep. of Germany

[73] Assignee: ESPE Fabrik Pharmazeutischer Praparate GmbH, Seefeld, Fed. Rep. of Germany

[21] Appl. No.: 865,749

[22] Filed: Dec. 29, 1977

Related U.S. Application Data

[63] Continuation-in-part of Ser. No. 568,156, Apr. 15, 1975, abandoned.

[51] Int. Cl.$^2$ .............................................. C08G 73/04
[52] U.S. Cl. ................................. 528/424; 260/583 P
[58] Field of Search ...................... 260/2 EN; 528/424

[56] References Cited

U.S. PATENT DOCUMENTS

| | | | |
|---|---|---|---|
| 2,626,931 | 1/1953 | Bastian | 260/2 EN |
| 3,409,660 | 11/1968 | Lloyd | 526/346 |
| 3,842,019 | 10/1974 | Kropp | 260/2 EN |

*Primary Examiner*—Wilbert J. Briggs, Sr.

*Attorney, Agent, or Firm*—Burns, Doane, Swecker & Mathis

[57] ABSTRACT

A novel process for the polymerization of aziridine compounds is disclosed. The polymerization process includes mixing an aziridine compound with a polymerization initiator having the formula:

$$R^1-\underset{\underset{A^\ominus}{|}}{S^\oplus}-\underset{\underset{R^2}{|}}{CH}-\underset{\underset{R^3}{|}}{CH}-B$$

where
R$^1$ is an alkyl radical of 1 to 18 C atoms,
R$^2$ is an alkyl radical of 1 to 18 C atoms or a phenyl alkyl radical of 7 to 18 C atoms, wherein said alkyl radicals may contain an ester group and/or ether group, R$^3$ and R$^4$ are hydrogen, an alkyl radical of 1 to 18 C atoms, and/or an aryl radical which can be substituted with a chloro, nitro or alkoxy group, whereby the alkyl radicals of R$^3$ and R$^4$ together or in combination with B can form a cycloaliphatic or heterocyclic ring, B is an electron attracting radical, and A$^\ominus$ is a non-nucleophilic anion.

Polyimines are quickly formed at ambient temperature.

9 Claims, No Drawings

POLYMERIZATION PROCESS FOR AZIRIDINE COMPOUNDS

This application is a continuation-in-part of copending U.S. application Ser. No. 568,156, filed Apr. 15, 1975, now abandoned.

Aziridines, which are also known as ethyleneimine compounds, can be converted into highly molecular polyimine compounds by means of catalysts which introduce and thus initiate polymerization. As a result of these polymerization initiators, the amino nitrogen of the aziridine ring is cationized and a cation chain reaction is started which leads to the polymerization under formation of the corresponding polyimines as described in more detail in the journal "Farbe und Lacke", 1961, page 71. When monomers are used which contain two or more aziridine groups, cross-linked solid plastics are obtained. Since cationization of the amino nitrogen of the aziridine ring can take place, for example, in the presence of inorganic or organic acids as well as Lewis-acids, acid esters or other alkylating agents, these substances had been used as polymerization initiators or hardening agents for diverse aziridine compounds.

German Pat. No. 388,170 discloses the use of neutral sulfuric acid or sulfonic acid esters as initiators for aziridine polymerization. In Swiss Pat. No. 484,977, a large number of these sulfuric acid or sulfonic acid esters as well as Friedel-Craft's catalysts are listed as suitable for the initiation of polymerization of aziridine compounds which are used in the production of hardened molded structures, coatings or adhesive layers of aromatic diethylene imine compounds.

The free inorganic acids have been found impractical because polymerization achieved with them starts so quickly that there is insufficient time for an even intermixing of the initiator with the monomer compound that is to be polymerized. The weak organic acids, especially those with long organic radicals, on the other hand act too slowly and will rarely lead to a complete hardening and cross-linking.

The alkyl or arylsulfonic acid esters have been used most in practice as initiators, generally in quantities of approximately 1 to 20 weight percent relative to the aziridine derivative. These ester compounds, however, have the disadvantage that they are split already hydrolytically by traces of water, as a result of which the acid is formed, which causes too rapid a polymerization and hardening of the aziridine compounds. Consequently, when these compounds are used as initiators, premature and surprising hardening effects occur whenever the material was not stored completely air tight and dry. Sulfuric acid esters, however, also show additional disadvantages because of their toxic and allergic effects, so that their use in hardening requires particular care. This is particularly important when they are to be used, for example, as polymerization initiators and hardening agents for cross-linkable, organic bifunctional aziridine compounds used in the production of masses for taking impressions of teeth or for dental models.

The so-called onium salts disclosed in the German Pat. No. 914 325, such as oxonium, ammonium or sulfonium salts which can also be used for hardening, do not show the above-noted detrimental physiological effects. However, the oxonium salts are even more subject to hydrolysis than the above mentioned esters and it is well known that they can be kept only for a short time at ambient temperature. The ammonium compounds which have been designated as usable, are salts of amines with strong acids which have a relatively short pot time. The sulfonium salts are such sluggish starters that they are practically inactive at ambient temperature and even at elevated temperatures will relatively slowly introduce polymerization of the aziridines. Therefore, there still is a need for improving the polymerization initiating and hardening of aziridine compounds, especially in those cases where they are used in medicine or dental medicine.

It is an object of this invention to alleviate the problems of the prior art.

It is also an object of the present invention to provide a physiologically harmless process for the polymerization of aziridine compounds which will not act too rapidly or too slowly.

It is another object of the present invention to provide a process for the initiation of polymerization of aziridine compounds.

It is a further object of the present invention to provide a process for the polymerization and hardening of aziridine compounds which are particularly useful for the production of dental molds and impressions.

It has now been found that certain substituted alkyl sulfonium salts which have at least one hydrogen atom and an electron attracting radical in the carbon atom of the alkyl group in $\beta$-position in regard to the sulfur atom, represent particularly suitable polymerization initiators and hardening agents for diverse mono- and poly-functional aziridine compounds. The polymerization introduced by these novel initiators occurs quickly and completely at ambient (or lower) temperature after the period of time required for the mixing and processing of the monomer compound that is to be polymerized. These alkyl sulfonium salts correspond to the general formula

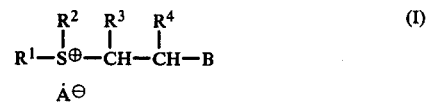

in which $R^1$ is an alkyl radical of 1 to 18 carbon atoms, $R^2$ is an alkyl radical of 1 to 18 carbon atoms or a phenyl alkyl radical with 7 to 18 carbon atoms, wherein said alkyl radicals may contain an ester group and/or ether group, and $R^3$ and $R^4$ are hydrogen, an alkyl radical of 1 to 18 carbon atoms, and/or an aryl radical which can be substituted with a chloro, nitro or alkoxy group, whereby the alkyl radicals $R^3$ and $R^4$ together or in combination with B can form a cycloaliphatic or heterocyclic ring B represents an electron attracting radical and $A^\ominus$ represents a non-nucleophilic anion.

The term "electron attracting radical" means to the man skilled in the art a group of atoms, which causes a withdrawing effect upon the electrons of the neighboured atoms within the same molecule; cf. also E. S. Gould "Mechanismus und Struktur in der organischen Chemie", Verlag Chemie 1962, page 248 f. The term "nucleophilic anion", is also understood in the art as disclosed in the said "Mechanismus und Struktur in der organischen Chemie" textbook, page 307 f., als well as C. G. Swain et al., J. Am. Chem. Soc. 75, page 141 (1953) and A. B. Ash et al., J. Org. Chem. 34, page 4071 (1969) and the term "non-nucleophilic anion" is meant those anions which are not nucleophilic.

The novel initiators can also be used for the hardening of such aziridine masses in case of which the aziridine groups that are to be polymerized are present only in a relatively high dilution. They are of particular advantage for use with the high molecular bifunctional aziridine compounds in dental practice when making impressions or when producing provisional replacement parts for teeth in situ, that is, in the mouth cavity, since after a short time of incubation in which the initiator can be completely and homogeneously mixed with the aziridine compound, polymerization and hardening then also starts at room temperature, whereby a quickly and completely hardened product will be obtained.

The sulfonium salts to be used according to the present invention show on the one hand no disadvantageous effects on the mucous membranes. Also, the polymerization introduced by them is carried completely to an end, so that no residual monomer remains which could possibly cause any irritation or damage to the mucous membranes.

In the case of the sulfonium salts used as a polymerization starter according to the invention, an electron attracting radical B is present on the carbon atom in β-position in relation to the sulfur atom beside at least one hydrogen atom. As a result, this hydrogen atom is properly activated to split off in the presence of the aziridine group as a proton and cationize the nitrogen atom, whereupon the chain reaction which leads to the hardening of the aziridine compound can start. Thus, it is important only that a clear electron attraction exists at the β-carbon atom to the sulfonium-sulfur by an electron-attracting moiety so that the hydrogen atom at this carbon atom can easily be split off by an aziridine moiety as proton. Since the sulfonium salts do not represent an alkylating agent, their effectiveness can thus not be explained with alkylation of the nitrogen atom of the aziridine group. Carbonyl, sulfonyl, nitrile, carbon ester or carbon amide groups are particularly suitable as electron attracting radicals. The oxygen in the ester or carbonyl groups can also be replaced by sulfur. The phenyl radical may also be utilized although the unsubstituted phenyl radical has a relatively low electron attracting effect. Substitution in the pheny radical, for example by a chlorine atom or especially by a nitro group, substantically increases the electron attracting effect of the phenyl radical. The nitrile radical is a particularly strong activator so that the compounds activated with a sulfonium salt containing a nitrile group are hardened relatively rapidly. The customary sulfonium salts which have no such electron attracting radical on the β-C-atom of an alkyl substituent, such as, for example, the well-known diethyldodecylsulfonium-bortetrafluoride have practically no effect as hardening agents for higher molecular weight aziridine compounds. Thus, there is no suggestion in the prior art, that such sulfonium salts substituted in a certain way as disclosed herein are useful in a particularly good and safe manner for the polymerization of aziridine compounds.

Therefore, a significant contribution for the activation effect of the novel polymerization starters of the present invention is due to the radical B in β-position in relation to the sulfonium-sulfur atom. This electron attracting radical, also shown in the subsequent examples, can also be component of a cycloaliphatic or heterocyclic ring together with one or both of the radicals $R^3$ or $R^4$ of the formula (I). Thus, in Examples 24, 46 and 48 a sulfonium salt has been used in which the electron attracting $SO_2$ group is the component of a heterocyclic ring which this group forms together with the radical $R^3$ of the general formula (I).

Preferred groups for the substituent B are the nitrile and the ester groups. These groups show an intensive electron attracting effect without, however, thereby increasing the hardening speed too greatly, which, as noted above, is undesirable. For $R^1$ of the formula (I), alkyl radicals with 1 or 2 carbon atoms are preferred, while for $R^2$, the preferred alkyl radicals contain from 6 to 18 carbon atoms. An ester group can be present in this radical. Examples for such an ester group-containing radical are the isooctyl acetate or the ethyl laurate radicals as shown in Examples 48 and 49.

Preferred non-nucleophilic anions are the fluoroborate, sulfonate, nitrate, perchlorate, methosulfate or fluorosulfate ion. Other non-nucleophilic anions are set out in Table II and Table IV.

The polymerization initiators of the present invention can be used with diverse types of aziridine compounds known in the art such as, for examples, ethyleneimine (aziridine), substituted aziridines and aziridine derivatives (e.g., 2-ethyleneimino-ethanol, N-butyl-ethyleneimine, ethyleneiminosuccinic acid-dimethyl ester, and the like) and other compounds (e.g., polyethers) containing aziridino end groups. Polymerization can be initiated by mixing the polymerization initiator with the aziridine compound at ambient temperature although temperatures above or below ambient may be utilized, if desired. The polymerization initiator may be added in any amount within the skill of the art effective to initiate polymerization.

In the following examples the invention will be explained in more detail using various substituted alkyl sulfonium salts and variable aziridine compounds which are to be considered as illustrative of the present invention. It should be understood, however, that the invention is not limited to the specific details of the Examples.

EXAMPLE 1

In 1.0 g of 2-ethyleneimino-ethanol (II), 0.1 g of β-(S-sec-butyl-S-ethyl-sulfonium)-propionic acid-(2-ethylhexyl)-ester-bortetrafluoride ($n_D^{20}$: 1.4498) was dissolved. After the addition of the polymerization initiator, polymerization started immediately which was recognizable by a rise in the temperature in a few seconds to about 100° C. After a few minutes, the polyimine had formed as an almost colorless, viscous oil, which is suitable for impregnation of paper in order to impart an increased wet strength to the latter.

EXAMPLE 2

0.02 g of β-(S-lauryl-S-ethylsulfonium)-β-phenylpropionic acid-ethyl-ester-bortetrafluoride ($n_D^{20}$: 1.4860) was dissolved in 1.0 g of the ethyleneimino compound II used in example 1. Polymerization started quickly with a temperature rise to about 80° C., and a colorless oil formed in a few minutes which can be used in the same manner as the polymer obtained in Example 1.

EXAMPLE 3

1.0 g of the ethyleneimine compound II were reacted with 0.02 g of β-(S-octyl-S-ethyl-sulfonium)-butyronitrile-bortetrafluoride (III) ($n_D^{20}$:1.4499). In a short time and with a temperature rise to about 75° C., the polyimine formed as a colorless oil. When 0.1 g of the initiator compound III was used, the polyimine formed with great heating and a violent reaction as a colorless paste.

EXAMPLE 4

1.0 g of N-butyl-ethyleneimine was mixed with 0.1 g of the initiator compound III. The temperature rose to about 100° C. After a few minutes, polymerization was completed and the polyimine had developed as a colorless oil.

EXAMPLE 5

1.0 g of ethyleneimino-succinic acid-dimethyl ester was reacted with 0.1 g of the initiator compound III. Polymerization started immediately after the addition of the initiator compound in a violent reaction and the polyimine developed in the form of a bright-yellow rubberlike mass.

EXAMPLE 6

After mixing of 1.0 g of ethyleneimino-acetic acid-methyl-ester with 0.1 g of the initiator compound III, there is obtained practically instantaneously in a violent reaction the polyimine as a tough, bright-brown mass.

EXAMPLE 7

0.02 g of the initiator compound III was stirred into 1.0 g of 2.2-bis-(p-β-hydroxy-ethoxy-phenyl)-propane-bis-α-ethyleneimino-propionate (IV). Gelling and hardening began quickly so that after about 1 minute, a very hard cross-linked polyimine product had formed.

In the following Table I, Examples 8 to 24 are summarized. Each of these Examples was carried out in the same manner as described in Example 7 with the bifunctional aziridine derivative IV used and, with the use of various sulfonium salts of the formula V

as polymerization initiator, whereby in this case the radical $R^5$ stands for the group

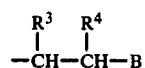

of the formula (I). In the third to the last column, the refractive index ($n_D^{20}$) or the melting point for each sulfonium salt used, is given. The two last columns of Table I give for the individual Examples in how many minutes after the addition of the sulfonium salt the gelling started or the polymerization and hardening was essentially ended.

Most of the sulfonium salts mentioned in the examples are oils at ambient temperature and it was possible to mix them in as such directly into the aziridine derivatives. The sulfonium salts which are solid at ambient temperature, (and the melting points of which are given in the third to the last column of Table I) were dissolved in a ratio of 1:2 with sulfolane or propylene glycol-carbonate-1,2, and this solution was then admixed to the aziridine that was to be hardened.

TABLE I

| Ex. No. | Sulfonium Salt (V) Weight percent | $R^1$ | $R^2$ | $R^5$ | $A^\ominus$ | $n_D^{20}$ or melting point | Gelling Time (min) | Hardening Time (min) |
|---|---|---|---|---|---|---|---|---|
| 8 | 2.4 | $C_2H_5$ | $C_{12}H_{25}$ | $-CH_2-CH_2-COOC_8H_{17}$ | $BF_4$ | 1.4522 | 2.5 | 5 |
| 9 | 5 | $CH_3$ | " | " | Methosulfate | 1.4702 | 5 | 20 |
| 10 | 2 | $C_2H_5$ | sec-$C_4H_9$ | " | $BF_4$ | 1.4498 | 2.5 | 3.5 |
| 11 | 5 | $CH_3$ | $C_{12}H_{25}$ | $-CH_2-CH_2-COOC_2H$ | Methosulfate | 28° C. | 3.5 | 5 |
| 12 | 8 | " | " | " | 2,5-Dichloro-benzolsulfonate | 1.5190 | 3 | 6 |
| 13 | 2 | $C_2H_5$ | sec-$C_4H_9$ | " | $BF_4$ | 1.4440 | 2 | 3.5 |
| 14 | 1.4 | " | $C_{12}H_{25}$ | $-CH_2-CH_2-COO-C_2H_4-O-C_2H_5$ | $BF_4$ | 1.4495 | 2.5 | 4 |
| 15 | 4 | $CH_3$ | $C_4H_9$ | $-CH_2-CH_2-COOC_2H_5$ | 2,5-Dichloro-benzolsulfonate | 1.5355 | 3.5 | 5 |
| 16 | 1.7 | $C_2H_5$ | $C_{12}H_{25}$ | $-CH_2-CH_2-COOCH_3$ | $BF_4$ | 1.4492 | 2.5 | 4 |
| 17 | 1.7 | " | " | $-\overset{CH_3}{\underset{\phantom{}}{CH}}-CH_2-COOCH_3$ | $BF_4$ | 1.4524 | 2.5 | 3.5 |
| 18 | 3 | " | $C_6H_{13}$ | $-CH_2-\overset{CH_3}{\underset{\phantom{}}{CH}}-CN$ | $BF_4$ | 1.4492 | 5.5 | 8 |
| 19 | 6 | " | $C_8H_{17}$ | " | $BF_4$ | 1.4491 | 4 | 6 |
| 20 | 3 | " | $C_6H_5CH_2CH_2$ | " | $BF_4$ | 42° C. | 3.5 | 4.5 |
| 21 | 5 | $C_2H_5$ | 2-$C_2H_5-C_6H_{12}$ | $-CH_2-\overset{CH_3}{\underset{\phantom{}}{CH}}-CN$ | $BF_4$ | 1.4523 | 3 | 5.5 |
| 22 | 4 | " | $C_{12}H_{25}$ | $-CH_2-CH_2-CO-N(C_2H_5)_2$ | $BF_4$ | 1.4621 | 2. | 10 |
| 23 | 2 | " | " | $-CH_2-CH_2-CO-C_6H_5$ | $BF_4$ | 1.4881 | 0.5 | 1 |
| 24 | 1.5 | " | " | $-CH\overset{CH_2-CH_2}{\underset{CH_2}{\diagdown\!\diagup}}SO_2$ | $BF_4$ | 75° C. | 1.3 | 2 |

In the following Table II, Examples 25 to 38 are summarized. Each of these Examples was carried out in the same manner as described in Example 7 with the bifunctional aziridine derivative 2.2-bis-(p-β-hydroxy-ethoxy-phenyl)-propane-bis-α-ethylenimino-butyrate used and, with the use of various sulfonium salts of the formula (V)

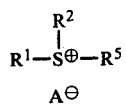

(V)

as polymerization initiator, whereby in this case the radical $R^5$ stands for the group

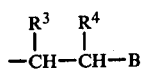

of the formula (I). In the third to the last column, the refractive index ($n^{20}_D$) for each sulfonium salt used, is given. The two last columns of Table III give for the individual Examples in how many minutes after the addition of the sulfonium salt the gelling started or the polymerization and hardening was essentially ended.

EXAMPLE 39

1.0 g of a polyether with aziridino end groups (VI), having an average molecular weight of about 6500 and the production of which is described in the German Pat. No. 1,745,810 is mixed with 0.1 g of β-(S-lauryl-S-ethyl-sulfonium)-propionic acid-(2-ethyl-hexyl)-ester-fluoroborate ($n_D^{20}$ 1.4522). After about 6 minutes, gelling starts and after about 45 minutes a rubber-elastic, solid mass has developed.

In the following Table III, Examples 40 to 49 have been summarized. All of these examples have all been carried out with the aziridine derivative (VI) of Example 25 and with the use of the stated sulfonium salts of the formula (V) as a polymerization initiator. In Table III, in the third to the last column, the refractive index ($n_D^{20}$) or the melting point of the sulfonium salt used is given. The two last columns state the time for gelling to occur after the mixing and the time polymerization concluded and a dust-dry, solid rubber-eleastic mass had developed.

TABLE II

| Ex. No. | Sulfonium Salt (V) weight percent | $R^1$ | $R^2$ | $R^5$ | $A^\ominus$ | $n_D^{20}$ or melting point | Gelling time (min) | Hardening time (min) |
|---|---|---|---|---|---|---|---|---|
| 25 | 4 | $C_2H_5$ | $C_{12}H_{25}$ | $-CH_2-CH_2-COO-C_8H_{17}$ | Cl—⟨C₆H₄⟩—SO₃ | 1.4982 | 2.5 | 4.8 |
| 26 | 4 | " | " | " | ⟨C₆H₅⟩—SO₃ | 1.4930 | 2.8 | 9 |
| 27 | 4 | " | " | " | $C_{12}H_{25}O-SO_3$ | 1.4645 | 2.7 | 3.8 |
| 28 | 10 | " | " | " | $CH_3$—⟨C₆H₄⟩—SO₃ | 1.4950 | 2.2 | 5 |
| 29 | 4 | " | " | " | $C_2H_5OSO_3$ | 1.4642 | 2.5 | 3.5 |
| 30 | 10 | " | " | " | $CH_3SO_3$ | 1.4752 | 2 | 6 |
| 31 | 4 | " | " | " | $2-C_2H_5-C_6H_{12}-O-SO_3$ | 1.4705 | 2.5 | 4 |
| 32 | 10 | " | " | " | $CH_2OH-CH_2-SO_3$ | 1.4708 | 1.5 | 3 |
| 33 | 4 | " | " | " | $SbF_6$ | 1.4510 | 2.2 | 3 |
| 34 | 4 | " | " | " | $AsF_6$ | 1.4525 | 1.6 | 2.5 |
| 35 | 4 | $C_2H_5$ | $C_{12}H_{25}$ | $-CH_2-CH_2-COO-C_8H_{17}$ | $CH_3\text{-}N(CH_3CO)\text{-}C_2H_4\text{-}SO_3$ | 1.4760 | 2.7 | 8 |
| 36 | 10 | " | " | " | $CH_3CO-NH$—⟨C₆H₄⟩—$SO_3$ | 1.4765 | 1.3 | 4 |
| 37 | 10 | " | " | " | $CH_3CO\text{-}N(CH_3)$—⟨C₆H₄⟩—$SO_3$ | 1.4880 | 2.8 | 5.5 |
| 38 | 5 | " | " | " | $CH_3CO\text{-}N(C_4H_9)$—⟨C₆H₄⟩—$SO_3$ | 1.4915 | 1.5 | 4 |

TABLE III

| Ex. No. | Sulfonium Salt (V) weight percent | $R^1$ | $R^2$ | $R^5$ | $A^\ominus$ | $n_D^{20}$ or melting point | Gelling Time (min) | Time, Polymer formed in rubber-elast product (min) |
|---|---|---|---|---|---|---|---|---|
| 40 | 20 | $C_2H_5$ | $C_{12}H_{25}$ | $-CH_2-CH_2-COO-C_2H_4-O-C_2H_5$ | $BF_4$ | 1.4495 | 5 | 40 |
| 41 | 2 | " | " | $\underset{-CH-CH_2-CN}{\overset{CH_3}{\|}}$ | $BF_4$ | 1.4565 | 2 | 8 |
| 42 | 7 | " | $C_8H_{17}$ | $-CH_2-CH_2-CN$ | $BF_4$ | 1.4487 | 2.5 | 8 |
| 43 | 5 | " | $C_{12}H_{25}$ | " | $BF_4$ | 63° C. | 2.3 | 8.5 |
| 44 | 3 | " | " | $\underset{-CH-CH_2-CO-N(C_2H_5)_2}{\overset{C_6H_5}{\|}}$ | $BF_4$ | 35° C. | 0.5 | 2 |
| 45 | 2.5 | " | " | $-CH_2-CH_2-CO-C_6H_5$ | $BF_4$ | 1.4881 | 2 | 10 |
| 46 | 20 | " | " | $\begin{array}{c}CH_2-CH_2\\ \|\qquad\quad\diagdown\\ \quad\qquad\qquad SO_2\\ \|\qquad\quad\diagup\\ -CH-CH_2\end{array}$ | $BF_4$ | 75° | 5 | 12 |
| 47 | 7 | " | " | $\underset{-CH-CH_2-COOC_2H_5}{\overset{m-NO_2-C_6H_4}{\|}}$ | $BF_4$ | 1.4948 | 2 | 4 |
| 48 | 3 | " | $\begin{array}{c}2-C_2H_5-C_6H_{12}-\\ -OOC-CH_2\end{array}$ | $\begin{array}{c}CH_2-CH_2\\ \|\qquad\quad\diagdown\\ \quad\qquad\qquad SO_2\\ \|\qquad\quad\diagup\\ -CH-CH_2\end{array}$ | $BF_4$ | 49° | 1.5 | 6 |
| 49 | 6 | " | $C_{11}H_{23}COOC_2H_4$ | $\underset{CH-CH_2-CN}{\overset{CH_3}{\|}}$ | $BF_4$ | 1.4647 | 1.5 | 4.5 |

In the following Table IV, Examples 50–81 have been summarized. All of these examples have all been carried out with the aziridine derivative (VI) of Example 39 and with the use of the stated sulfonium salts of the formula (V) as a polymerization initiator. In Table IV, in the third to the last column, the refractive index ($n_D^{20}$) or melting point of the sulfonium salt used is given. The two last columns state the time for gelling to occur after the mixing and the time polymerization concluded and a dust-dry, solid rubber-elastic mass had developed.

Most of the sulfonium salts mentioned in the examples are oils at ambient temperature and it was possible to mix them in as such directly into the aziridine derivatives. The sulfonium salts which are solid at ambient temperature, (and the melting points of which are given in the third to the last column of Table IV) were dissolved in a ratio of 1:2 with sulfolane or propylene glycol-carbonate-1,2, and this solution was then admixed to the aziridine that was to be hardened.

TABLE IV

| Example No. | Sulfonium Salt (V) weight percent | R¹ | R² | R⁵ | A⊖ | $n_D^{20}$ or melting point | Gelling time (min) | Time, polymer formed in rubber-elast. product (min) |
|---|---|---|---|---|---|---|---|---|
| 50 | 8 | C₂H₅ | C₁₃H₂₇—COO—CH₂ | —CH₂—CH₂—COO—C₁₈H₃₅ (-oleyl) | BF₄ | 1.4611 | 2.3 | 7 |
| 51 | 11 | " | C₁₂H₂₅—COO—CH₂ | " | BF₄ | 1.4720 | 2.5 | 9 |
| 52 | 10 | " | C₁₈H₃₇—COO—CH₂ | " | BF₄ | 1.4950 | 3 | 15 |
| 53 | 12 | " | C₁₂H₂₅—COO—CH₂ | " | BF₄ | 1.4510 | 1.7 | 7 |
| 54 | 9 | " | " | —CH₂—CH₂—COO—C₈H₁₇ | BF₄ | 1.4825 | 3 | 8 |
| 55 | 12 | " | " | " | 2-C₂H₅—C₆H₁₂—O—SO₃ | 1.4608 | 3.2 | 15 |
| 56 | 12 | " | " | —CH₂—CH₂—COO—C₁₈H₃₇ | BF₄ | 1.4525 | 2.3 | 8 |
| 57 | 12 | " | " | —CH₂—CH₂—COO—C₁₃H₂₇ | BF₄ | 1.4535 | 2.3 | 11 |
| 58 | 11 | " | " | —CH(CH₃)—CH₂—COO—C₁₈H₃₅ (-oleyl) | BF₄ | 1.4690 | 1 | 3 |
| 59 | 10 | " | C₁₈H₃₇—COO—CH₂ | " | BF₄ | 1.4655 | 1.5 | 3.5 |
| 60 | 12 | C₂H₅ | C₁₂H₂₅—COO—CH₂ | —CH(CH₃)—CH₂—COO—C₈H₁₇ | BF₄ | 1.4503 | 1 | 3 |
| 61 | 12 | " | " | " | 2-C₂H₅—C₆H₁₂—O—SO₃ | 1.4604 | 1.3 | 4.5 |
| 62 | 12 | " | " | " | BF₄ | 1.4820 | 1.7 | 4.5 |
| 63 | 16 | " | 2-C₂H₅—C₆H₁₂—COO—CH₂ | —CH₂—CH₂—COO-2-C₂H₅—C₆H₁₂ | BF₄ | 1.4513 | 2.3 | 8 |
| 64 | 12 | " | CH₃—CH— | —CH₂—CH₂—OOC—C₆H₃Cl₂ | BF₄ | 1.4960 | 2.7 | 10 |
| 65 | 6 | C₂H₅ | C₁₂H₂₅ | —CH(C₁₁H₂₃)—CH₂—CN | BF₄ | 1.4655 | 1.3 | 4 |
| 66 | 6 | " | C₁₃H₂₇ | " | BF₄ | 1.4588 | 1.2 | 4 |
| 67 | 10 | C₂H₅ | C₁₂H₂₅ | —CH(CH₃)—CH₂—CN | BF₄ | 1.4762 | 2.8 | 15 |
| 68 | 6 | " | " | " | C₁₂H₂₅—⌬—SO₃ | 1.4978 | 3 | 15 |

TABLE IV-continued

| Example No. | Sulfonium Salt (V) weight percent | $R^1$ | $R^2$ | $R^5$ | $A^\ominus$ | $n_D^{20}$ melting point | Gelling time (min) | Time, polymer formed in rubber-elast. product (min) |
|---|---|---|---|---|---|---|---|---|
| 69 | 10 | " | " | " | $C_{12}H_{25}OSO_3$ | 1.4760 | 3 | 7 |
| 70 | 10 | " | " | " | $C_2H_5OSO_3$ | 1.4790 | 3.2 | 7 |
| 71 | 10 | " | " | " | $2\text{-}C_2H_5\text{—}C_6H_{12}\text{—}OSO_3$ | 1.4760 | 3.5 | 11 |
| 72 | 10 | " | " | " | 4-CH₃-C₆H₄-SO₃ | 1.4965 | 2.8 | 5 |
| 73 | 6 | " | " | " | " | grease | 0.7 | 2.5 |
| 74 | 6 | " | $C_{18}H_{37}$ | " | $AsF_6$ | grease | 1 | 3 |
| 75 | 6 | " | $2\text{-}C_2H_5\text{—}C_6H_{12}$ | " | $SbF_6$ | 66° C. | 1.2 | 2 |
| 76 | 6 | $CH_3$ | | | $BF_4$ | 84° C. | 2 | 5 |
| 77 | 3 | $CH_3$ | $C_8H_{17}$ | $\begin{array}{c}CH_3\\|\\-CH-CH_2-CN\end{array}$ | 2,4-Cl₂-C₆H₃-SO₃ | 53° C. | 2.3 | 9 |
| 78 | 6 | " | $C_{18}H_{37}$ | $\begin{array}{c}C_6H_{13}\\|\\-CH-CH_2-CN\end{array}$ | 2,4-Cl₂-C₆H₃-SO₃ | 76° C. | 2.2 | 9 |
| 79 | 12 | $C_2H_5$ | $C_{12}H_{25}$ | $\begin{array}{c}CH_3\\|\\-CH-CH_2-COO-C_8H_{17}\end{array}$ | $BF_4$ | 1.4575 | 4.6 | 15 |
| 80 | 12 | " | $C_{13}H_{27}$ | $\begin{array}{c}CH_3\\|\\-CH-CH_2-COO-C_{18}H_{35}\\(\text{-oleyl})\end{array}$ | $BF_4$ | 1.4610 | 4.5 | 15 |
| 81 | 12 | " | " | " | $SbF_6$ | grease | 6.5 | 20 |

EXAMPLE 82

An ethyleneimine preparation usuable for the production of dental replacement parts was produced as follows:

100 g of the ethyleneimine compound (IV) was kneaded together with 35 g of nylon powder (<60μ), which serves as a filler and which were colored similarly to the color of teeth by the addition of cadmium sulfide pigment.

For the production of a semipermanent bridge, 7 g of this paste was mixed with 0.3 g of the sulfonium salt of Example 19 and the mixture was inserted into an alginate impression which had been obtained prior to the preparation of the pillar teeth and in which a connecting groove had been cut between the impressions of said pillar teeth. Immediately thereafter, the impression was replaced into the mouth of the patient. After the beginning of hardening, the impression together with the hardening molded body was taken from the mouth and allowed to harden for about 10 minutes. Subsequently, the provisional bridge was finished in the customary manner by removal of the excess and polishing.

EXAMPLE 83

For the production of a mass for taking impressions for dental purposes, 800 g of the bifunctional ethyleneimine compound (VI), of Example 39, was kneaded together with 150 g of fine diatomaceous earth to form a paste. 30 g of the paste was mixed with 2% of the sulfonium salt of Example 45 and the mixture was immediately inserted with a suitable tray into the mouth of the patient. After about 10 minutes, the impression was taken out. A dimensionally-stable but rubber-elastic impression of the part of the mouth that is to be copied was obtained.

COMPARATIVE EXAMPLE

The surprising effect of the sulfonium salts of the present invention is shown by the following comparative experiments in which a customary sulfonium salt was also used as a polymerization initiator for aziridine derivatives.

The bifunctional aziridine derivatives IV or VI respectively, used in Examples 8 to 24 (Table I), and 40 to 46 (Table III) were used as well as the following sulfonium salts:

(1) A sulfonium salt known in the prior art:

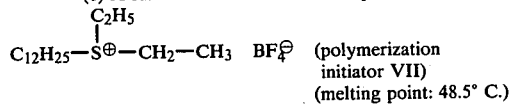

C$_{12}$H$_{25}$—S$^\oplus$—CH$_2$—CH$_3$  BF$_4^\ominus$  (polymerization initiator VII)
(melting point: 48.5° C.)

and (2) sulfonium salts of the present invention:

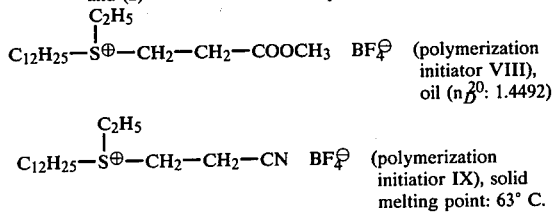

C$_{12}$H$_{25}$—S$^\oplus$—CH$_2$—CH$_2$—COOCH$_3$  BF$_4^\ominus$  (polymerization initiator VIII), oil (n$_D^{20}$: 1.4492)

C$_{12}$H$_{25}$—S$^\oplus$—CH$_2$—CH$_2$—CN  BF$_4^\ominus$  (polymerization initiatior IX), solid melting point: 63° C.

As can be seen from the formulas, the three sulfonium salts used here as polymerization initiators have a very similar composition.

The two polymerization initiators of the present invention (VIII and IX) differ from the conventional sulfonium salt (VII) through the presence of an ester or nitrile group additionally present as an electron attracting radical on the carbon atom in β-position in relation to the sulfur atom.

In these experiments, each of the sulfonium salts were added to the aziridine derivatives in a quantity of 5% by weight. The sulfonium salts were first dissolved in twice the weight of sulfolane and were added in the form of the solutions.

The following results were obtained:

In experiment A utilizing the sulfonium salt of the prior art (VII), and using the aziridine compound IV, no change was recognizable after 1 hour at ambient temperature. Even after an additional 2 hours at 50° C., no change of the mixture was recognizable.

Similarly, in experiment B, which was carried out with the substances VI+VII, no change was found after 1 hour at ambient temperature and after 2 additional hours at 50° C.

In experiment C, carried out according to the present invention and using the substances IV+VIII, complete hardening of the mixture occured after 3 minutes at ambient temperature.

Also, in experiment D, which was carried out using the substances VI+IX, the cross-linking into a rubber-like mass had been completed within 8 minutes at ambient temperature.

Thus it is proven that known sulfonium salts are unsuitable as starters for the polymerization of aziridine derivatives. Even at 50° C., they are completely ineffective. The alkyl sulfonium salts, substituted according to the present invention on the contrary, trigger a quick polymerization even at ambient temperature, which is essentially completed within a few minutes.

The sulfonium salts of Examples 1-83 were prepared using well-known procedures.

In the first step the thioether R$^1$—S—R$^5$ is prepared by the addition of the corresponding mercaptan to an unsaturated compound. The reaction of this thioether with a strong alkylating agent (e.g., trialkyloxonium-bortetrafluoride) yields directly the sulfonium salt.

The preparation of sulfonium salts with some non-nucleophilic anions in the above described way is only with difficulties or not all possible. These sulfonium salts are prepared by reaction of the sulfonium-bortetrafluoride with the potassium salt of the corresponding non-nucleophilic anion.

The following two examples illustrate these two procedures.

EXAMPLE 84

Preparation of

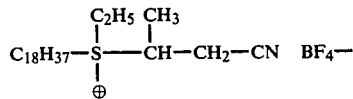

C$_{18}$H$_{37}$—S—CH—CH$_2$—CN  BF$_4^-$

Sodiummethoxide (100 mg) was suspended in stearyl mercaptan (57.2 g, 0.2 mol). Crotonitril (16.8 g, 0.25 mol) was added dropwise under N$_2$-atmosphere at 50° C. After 12 hours the reaction solution was taken up in methylene chloride. The solution was washed with 2 n sulfuric acid and with water, dried and the solvent removed under vacuum. The resulting crystalline mass was recrystallized from ethanol to give 56.5 g, 80% yield of 3-(stearylmercapto)-butyronitrile, melting at 38° C.

This thioether (10 g, 28.3 m mol) and triethyloxoniumbortetrafluoride (5.5 g, 29 m mol) were dissolved in methylene chloride and stirred for 12 hours at room temperature. The solution was diluted with methylene chloride, washed with water, dried and the solvent removed under vacuum. β-(S-stearyl-S-ethyl-sulfonium)-butyronitrile-bortetrafluoride was recrystallized from ethylacetate to give 12.6 g, 95% yield, melting at 60° C.

EXAMPLE 85

Preparation of

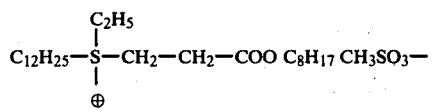

β-(S-lauryl-S-ethyl-sulfonium)-propionic-acid-octyl-ester-bortetrafluoride was prepared analogous to Example 84. This sulfonium salt (50.2 g, 100 m mol) was dissolved in 100 ml methanol, potassium-methane-sulfonate (14.1 g, 105 m mol) was added and stirred for 12 hours at room temperature. The crystallized sodium-bortetrafluoride was removed by centrifuge. The solvent was removed, to give 50.5 g, 99% yield of β-(S-lauryl-S-ethylsulfonium)-propionic-acid-octyl-ester-methane-sulfonate ($n_D^{20} = 1.4752$).

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An improved process for the production of an aziridine polymer which comprises mixing an aziridine compound with a polymerization initiator having the formula:

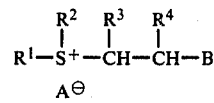

where
$R^1$ is an alkyl radical of 1 to 18 C atoms,
$R^2$ is an alkyl radical of 1 to 18 C atoms or a phenyl alkyl radical of 7 to 18 C atoms, wherein said alkyl radicals may contain an ester group and/or ether group, $R^3$ and $R^4$ are hydrogen, an alkyl radical of 1 to 18 C atoms,
and/or an aryl radical which can be substituted with a chloro, nitro or alkoxy group, whereby the alkyl radicals of $R^3$ and $R^4$ together or in combination with B can form a cycloaliphatic or heterocyclic ring, B is an electron attracting radical, and A is a non-nucleophilic anion, the polymerization initiator being present in an amount effective to polymerize said aziridine compound.

2. The process of claim 1 wherein $R^1$ is methyl or ethyl.

3. The process of claim 2 wherein $R^2$ is an alkyl radical of 6 to 18 C atoms.

4. The process of claim 3 wherein $R^3$ and $R^4$ are each alkyl radicals of 1 to 18 C atoms.

5. The process of claim 1 wherein B is a carbonyl, sulfonyl, nitrile, ester or amide group.

6. The process of claim 5 wherein B is a sulfonyl group, $R^3$ or $R^4$ are alkyl radicals of 1 to 18 C atoms, the alkyl radicals of $R^3$ or $R^4$ and the $SO_2$ group of B forming a heterocyclic ring.

7. The process of claim 5 wherein B is an ester or nitrile group.

8. The process of claim 1 wherein A is selected from the group consisting of fluoroborate, sulfonate, nitrate, perchlorate, methosulfate and fluorosulfate ions.

9. The process of claim 1 wherein said aziridine compound and polymerization initiator are mixed at ambient temperature.

* * * * *